United States Patent
Kawashima (10) Patent No.: US 7,457,323 B2
(45) Date of Patent: Nov. 25, 2008

(54) DEMULTIPLEXER CIRCUIT

(75) Inventor: Toshitsugu Kawashima, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 665 days.

(21) Appl. No.: 11/088,834

(22) Filed: Mar. 25, 2005

(65) Prior Publication Data

US 2005/0220089 A1    Oct. 6, 2005

(30) Foreign Application Priority Data

Mar. 31, 2004   (JP)   ............... 2004-105906

(51) Int. Cl.
*H04J 3/06* (2006.01)
(52) U.S. Cl. ........................ 370/517; 375/365
(58) Field of Classification Search .......... None
See application file for complete search history.

(56) References Cited

U.S. PATENT DOCUMENTS 6,393,082 B1 *   5/2002   Nakamura ............... 375/368

2003/0161429 A1   8/2003   Chiang

FOREIGN PATENT DOCUMENTS

JP           11-187002           7/1999

OTHER PUBLICATIONS

European Search Report dated Jul. 8, 2005.

* cited by examiner

*Primary Examiner*—Chau Nguyen
*Assistant Examiner*—Tito Pham
(74) *Attorney, Agent, or Firm*—McGinn IP Law Group, PLLC (57) ABSTRACT

A demultiplexer circuit includes a first serial-to-parallel conversion circuit for receiving input serial data and for performing serial-to-parallel conversion to output resultant data to parallel paths, a code detection circuit for activating and outputting a detection signal on detection of coincidence between output data sent out from the first serial-to-parallel conversion circuit to the parallel paths and a predetermined check code, a circuit for generating recovery clocks of a period corresponding to the length of a predetermined number of bits of the input serial data, and for varying the period of the recovery clocks, in case the detection signal from the code detection circuit is activated, in dependence upon bit deviation of the detection signal, to output resulting recovery clocks; and a second serial-to-parallel conversion circuit for converting data serially transmitted on the parallel paths into parallel data to output resulting parallel data responsive to the recovery clocks.

13 Claims, 9 Drawing Sheets

FIG. 5A  COMMA DETECTION SIGNAL

FIG. 5B  SYNCHRONIZED COMMA AND COMMA WITH 1BIT DEVIATION

FIG. 5C  COMMA WITH 2 OR 3BIT DEVIATION

FIG. 5D  COMMA WITH 4 OR 5BIT DEVIATION

FIG. 5E  COMMA WITH 6 OR 7BIT DEVIATION

FIG. 5F  COMMA WITH 8 OR 9BIT DEVIATION

FIG. 10A COMMA DETECTION SIGNAL

FIG. 10B SYNCHRONIZED COMMA AND COMMA WITH 1BIT DEVIATION

FIG. 10C COMMA WITH 2 OR 3BIT DEVIATION

FIG. 10D COMMA WITH 4 OR 5BIT DEVIATION

FIG. 10E COMMA WITH 6 OR 7BIT DEVIATION

FIG. 10F COMMA WITH 8 OR 9BIT DEVIATION

FIG. 11 PRIOR ART

USUS 7,457,323 B2

DEMULTIPLEXER CIRCUIT

FIELD OF THE INVENTION

This invention relates to a receiving device in data transmission. More particularly, it relates to a demultiplexer circuit for aligning received serial data to parallel data.

BACKGROUND OF THE INVENTION

Figure 11:
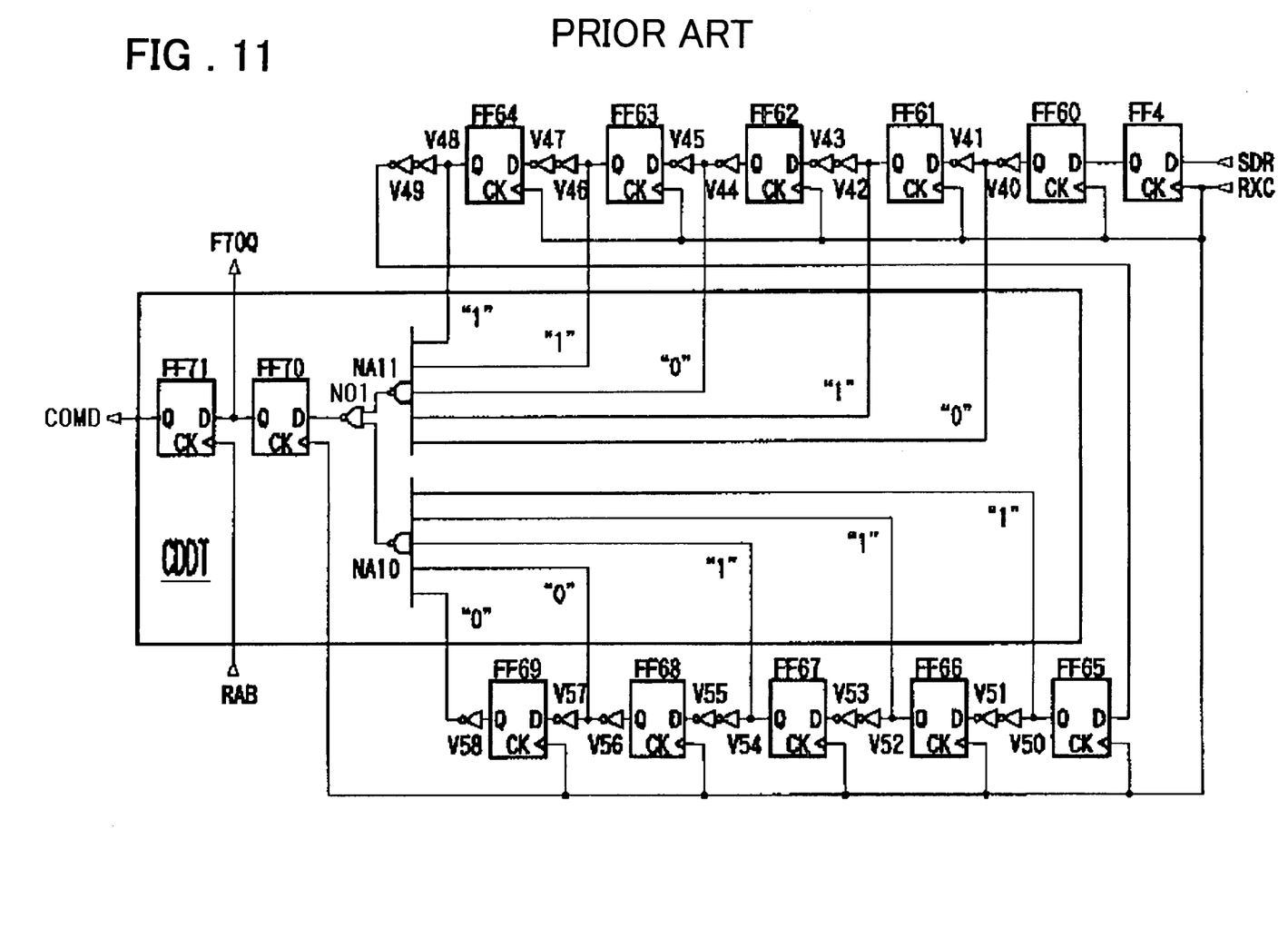
FIG. 11 shows the configuration of a conventional code detection circuit (FIG. 6 of Patent Publication).

In a receiving circuit of an LSI (large-scale integrated circuit) for high speed communication, supporting the high-speed serial transfer with a transfer rate in a Giga-bit range, there is provided a serial-to-parallel conversion circuit adapted for converting serially transmitted received data into byte-based parallel data (termed a demultiplexer or DEMUX). This serial-to-parallel conversion circuit includes a code detection circuit for detecting a header byte code for byte alignment (termed a COMMA code) from serially entered received data (see Patent Document 1 below). FIG. 11 hereof shows FIG. 6 of this Patent Document 1 for reference sake. Referring to this FIG. 11, a code detection circuit CDDT of the serial-to-parallel conversion circuit includes flipflops FF60 to FF69, forming a shift register for serial-to-parallel conversion of serially entered received data SDR, NAND gates NA10, NA11, for receiving a preset combination of non-inverting and inverting output signals of the flipflops, and a NOR gate NO1 for receiving output signals of the NAND gates. As for the outputs of the NAND gates NA10, NA11, when the consecutive 10 bits of the received serial data SDR are found to be coincident with the comma code (e.g. the logic signal "0011111010", the code detection signal COMD goes high at the second next clock cycle as counted from the clock cycle in which the 10 bits of the received serial data are logic data of "0011111010" and, responsive thereto, parallel transfer of the received serial data commences. The Patent Publication 1 discloses a code detection circuit comprising an alternate serial interconnection of plural flipflops and plural 2-input logic gates, in which the flipflops are in operation responsive to received clocks so that output signals of the flipflops are selectively at an effective level when preset directly previous bits of input data serially entered in timed relation to the clocks are coincident with corresponding bits of a check code (comma code), and in which the logic gates discriminate that leading preset bits of input data are coincident with the corresponding bits of the check code or that the output signals of the directly previous flipflop or the next following flipflop are of the effective level and e.g. the next one bit of the input data coincides with the corresponding bit of the check code to transmit the state to the next downstream side flip-flops.

[Patent Document 1]
Japanese Patent Kokai Publication No. JP-A-11-187002 (pages 2 and 3 and FIG. 6)

SUMMARY OF THE DISCLOSURE

However, with the above-described conventional serial-to-parallel conversion circuit, a high-speed operation of respective circuits, such as demultiplexer circuit, to say nothing of the code detection circuit, is needed in order to cope with high-speed serial transmission, e.g., Giga-bit order transmission, with the result that timing designing is rendered difficult, while power consumption is increased.

Moreover, no consideration is given to bit deviation of the comma code in the received serial data, such as timing violation (jitter). Thus there is much to be desired in the art.

It is an object of the present invention to provide a demultiplexer device in which it is possible to improve the data transfer rate as the operating frequency of the circuit is maintained at a low value.

It is another object of the present invention to provide a demultiplexer device in which deviation of bits of the command code may be coped with.

The following is the gist of the present invention.

In one aspect, the present invention provides a demultiplexer circuit comprising: a first serial-to-parallel conversion circuit for receiving input serial data and for performing serial-to-parallel conversion to output resultant data to parallel paths; a code detection circuit for activating and outputting a detection signal on detection of coincidence between output data sent out from the first serial-to-parallel conversion circuit to the parallel paths and a predetermined check code; a circuit for generating recovery clocks of a period corresponding to the length of a predetermined number of bits of the input serial data, and for varying the period of the recovery clocks, in case the detection signal from the code detection circuit is activated, in dependence upon bit deviation of the detection signal, to output resulting recovery clocks; and a second serial-to-parallel conversion circuit for converting data serially transmitted on the parallel paths into parallel data to output resulting parallel data responsive to the recovery clocks.

The demultiplexer circuit according to the present invention further comprises:

a circuit for elongating by a predetermined time duration of only one period of the recovery clocks based on clock signals of a frequency frequency-divided from a transfer frequency of the input serial data, depending on the bit deviation, on activation of the detection signal.

The demultiplexer circuit according to the present invention further comprises: a circuit for periodically generating the recovery clocks based on clock signals of a frequency frequency-divided from the transfer frequency of the input serial data, when the detection signal is inactivated, in accordance with periods corresponding to the length of a predetermined number of bits of the input serial data.

The demultiplexer circuit according to the present invention further comprises: a control circuit for receiving the detection signal output from the code detection circuit and for elongating the time duration of the activated state of the detection signal to output a resulting signal; and a circuit for setting the recovery clocks to an activated state when an output signal of the control circuit is in an activated state and the recovery clocks are in an inactivated state.

The first serial-to-parallel conversion circuit of the demultiplexer circuit according to the present invention serially receives the input serial data to perform 1:2 serial-to-parallel conversion thereon to output resulting data to first and second parallel paths; and the second serial-to-parallel conversion circuit includes a switching circuit for interchanging outputs of corresponding registering stages of the shift registers of the first path and the shift registers of the second path; and a latch circuit for receiving an output of the switching circuit and for outputting parallel data responsive to the recovery clocks.

The meritorious effects of the present invention are summarized as follows.

According to the present invention, the comma detection circuit and the shift registers in the serial-to-parallel conversion circuit may be run with frequency-divided clocks to decrease the operating frequency.

According to the present invention, byte alignment may be carried out accurately against bit deviation.

For further elucidation of the present invention, the preferred modes for carrying out the present invention are explained in detail. An arrangement according to an embodiment of the present invention comprises: a serial-to-parallel conversion circuit (20) for receiving received serial data and for performing the serial-to-parallel conversion, such as 1:2 serial-to-parallel conversion, on the serial data to output resulting two-path data; a code detection circuit (30) for activating and outputting a comma detection signal on detection of coincidence of the two-path output data from the serial-to-parallel conversion circuit (20) with a predetermined check code (comma mode); a control circuit (137-139, 40) for receiving the comma detection code from the code detection circuit (30) for outputting a signal corresponding to the comma detection signal the period of the activated state (pulse width) of which has been extended by a preset duration; and a recovery clock generating circuit (50) composed of a state machine transferring between different states based on frequency-divided clocks of received clocks. The recovery clock generating circuit generates recovery clocks of periods corresponding to a predetermined bit length (one symbol length, e.g., 10 bits) of the received input serial data, and varies the period of the recovery clocks to output the resulting clocks, on activation of the detection signal, responsive to bit deviation. The arrangement according to the present invention also comprises first and second delay circuits (131-133, 134-136) for delaying data serially transmitted on first and second parallel paths by a delay time corresponding to the delay time in the control circuit (137-139); and first and second shift registers (121-125, 126-130) for receiving outputs of the first and second delay circuits for converting the received outputs into respective parallel data, and a latch circuit (70) for receiving outputs of respective stages of the first and second shift registers in parallel and for sampling the outputs with the recovery clocks to output sampled data.

In the present embodiment, received clocks are halved in frequency to reduce the operating frequency of, e.g., the comma detection circuit, recovery clock generating circuit and the shift registers forming the parallel paths.

Also, in the present embodiment, should a bit deviation occur in the comma code (Comma), the recovery clocks are elongated by a preset time duration, for only one period, depending on the bit deviation of the comma detection signal. Moreover, the timing allowance of the downstream side circuitry is enhanced to avoid the risk of generation of timing violation (jitter). In an alternative embodiment, should a bit deviation occur, the period may be shortened by only one period in an amount which is dependent on the state of bit deviation.

BRIEF DESCRIPTION OF THE DRAWINGS

FIG. 3 shows the configuration of a recovery clock generating circuit of the first embodiment of the present invention.

FIG. 4 illustrates state transitions in the recovery clock generating circuit of the first embodiment of the present invention.

PREFERRED EMBODIMENTS OF THE DISCLOSURE

Referring to the drawings, preferred embodiments of the present invention are explained in detail.

Figure 1:
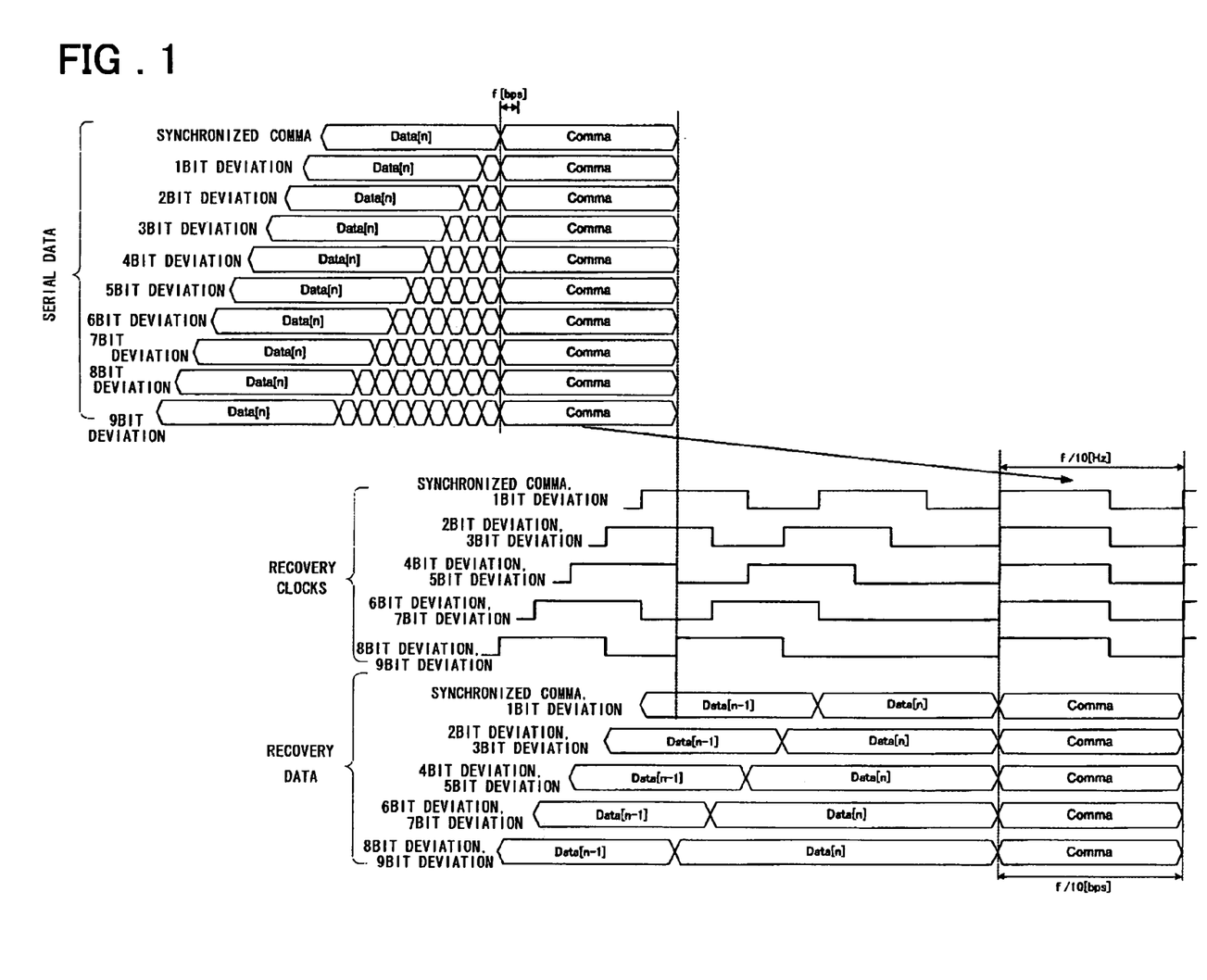
FIG. 1 illustrates the operating principle of a first embodiment of the present invention.

FIG. 1 illustrates the operating principle of an embodiment of the present invention. Specifically, FIG. 1 illustrates the timing operation of a demultiplexer (macro-cell) at a high-speed serial interface adapted for effecting 1:10 serial-to-parallel conversion and byte alignment. Referring to FIG. 1, recovery data of f/10 bps ( . . . , Data[n−1], Data[n], Comma) and recovery clocks of f/10 Hz are generated against serial data input with a transfer rate of f bps. It is noted that the received serial data is 8B-10B converted data. The received serial data is processed with byte alignment every symbol (every ten bits), responsive to rising edges of the recovery clocks, to issue 10-bit output parallel data. Moreover, when the 10-bit command code (Comma), made up by preset logical bits, as mentioned previously, is detected, the period of the recovery clocks is adjusted. In the present embodiment, 2-bit parallel data, obtained on 1:2 serial/parallel conversion, is subjected to bit alignment, in order to lower the latency for byte alignment.

In this circuit configuration, the period of the recovery clocks is changed the instant the byte alignment is carried out.

There are ten sorts of comma code positions in the received serial data, namely: synchronization, 1-bit deviation, 2-bit deviation, . . . , 9-bit deviation, as shown in FIG. 1. Should there be no gap between the comma code and symbol data (see 'synchronized comma' in FIG. 1), no adjustment of the recovery clock period is carried out.

Should the comma code be deviated by 1 to 9 bits from the 10-bit symbol, adjustment of the recovery clock period is carried out. The recovery clock is varied in five ways of f/10, f/12, f/14, f/16 and f/18 Hz instantaneously responsive to bit deviation of the comma code. Meanwhile, the change in the recovery clock periods occur for only one period for each alignment.

The adjustment of the recovery clock periods against the amount of deviation of the comma code (Comma) is carried out as follows:

(A) The period of a recovery clock for a synchronized comma code and a comma code with one-bit deviation is f/10 [Hz];

(B) the period of a recovery clock for a comma code with two-bit deviation and a comma code with three-bit deviation is f/12 [Hz];

(C) the period of a recovery clock for a comma code with four-bit deviation and a comma code with five-bit deviation is f/14 [Hz];

(D) the period of a recovery clock for a comma code with six-bit deviation and a comma code with seven-bit deviation is f/16 [Hz];

(E) the period of a recovery clock for a comma code with eight-bit deviation and a comma code with nine-bit deviation is f/18 [Hz].

Figure 2:
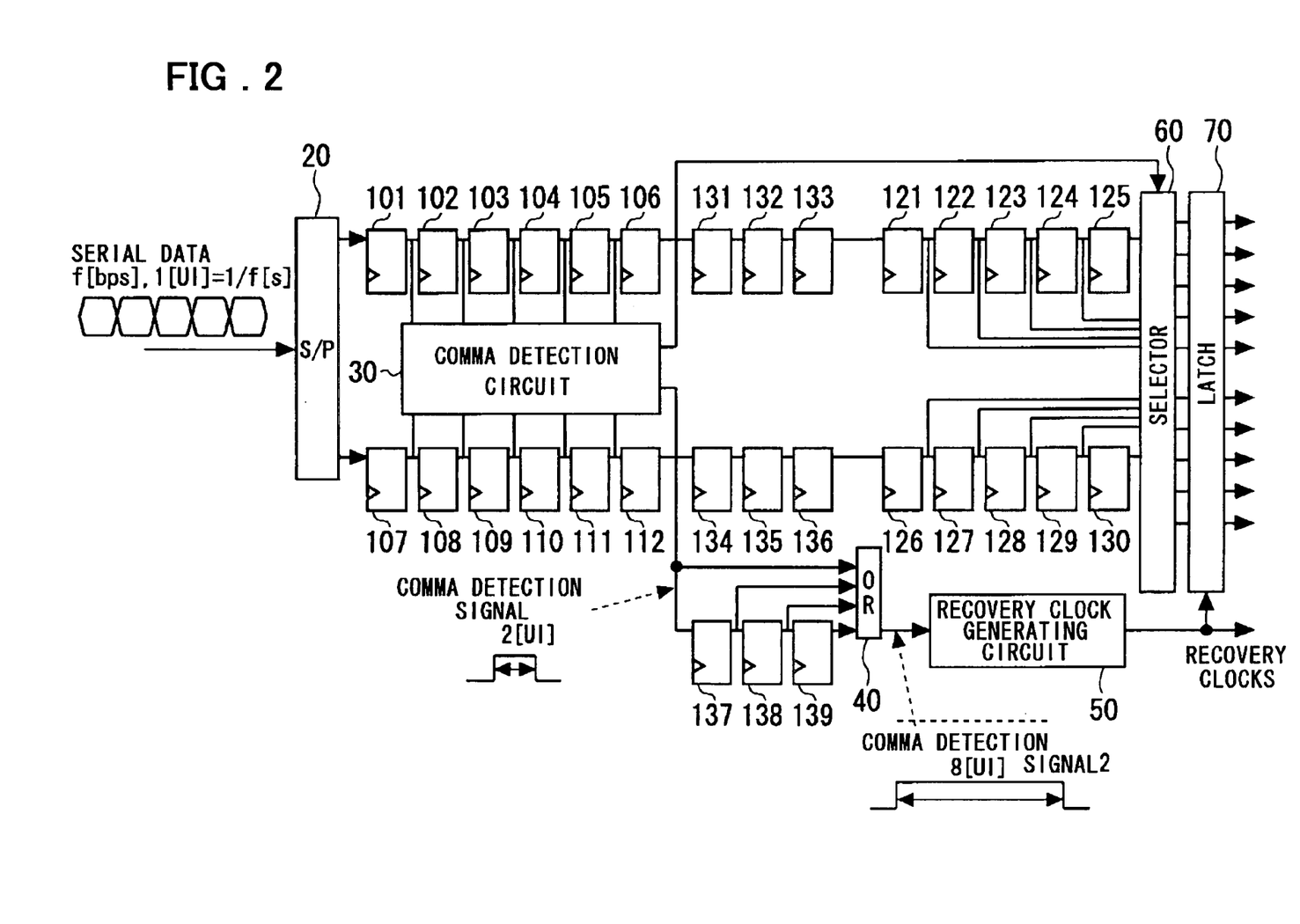
FIG. 2 shows the configuration of a demultiplexer circuit according to a first embodiment of the present invention.

FIG. 2 shows the configuration of the present embodiment. Specifically, FIG. 2 shows the configuration of a demultiplexer circuit adapted for receiving 8B-10B converted serial data to convert the data into 10-bit parallel data by the recovery clocks. This demultiplexer circuit (macro-cell) is used for an LSI for high-speed serial interface communication. Meanwhile, in FIG. 2, the serial data transfer rate is f bps.

Referring to FIG. 2, the demultiplexer circuit of the present embodiment includes a serial-to-parallel conversion circuit 20, supplied with serial bit data to perform 1:2 serial-to-parallel conversion thereon, a shift register (a string of flip-flops 101 to 106) receiving one of outputs of the serial-to-parallel conversion circuit 20, and a shift register (a string of flip-flops 107 to 112) receiving the other output of the serial-to-parallel conversion circuit 20. The demultiplexer circuit also includes a comma detection circuit 30 for detecting the coincidence between outputs of the string of flip-flops 101 to 106 and the string of flip-flops 107 to 112 on one hand and the comma signal on the other hand and for activating and outputting a comma detection signal, with a pulse width of 2 UI, in case of coincidence detection. The UI is acronym for Unit Interval denoting one bit period. The demultiplexer circuit also includes a shift register composed of flipflops 137 to 139 and an OR circuit 40 which is supplied with, for multiplexing, a comma detection signal from the comma detection circuit 30 and output signals of the flipflops 137 to 139 to output a resultant signal. The demultiplexer circuit also includes a recovery clock generating circuit 50 for receiving the output signal of the OR circuit 40 to generate recovery clocks, three-stage flipflops 131 to 133 and 134 to 136, that make up shift registers, flipflops 121 to 125 and 126 to 130, and a selector 160. The demultiplexer circuit also includes a latch 70 for latching 10-bit parallel data with the recovery clocks from the recovery clock generating circuit 50 to output resulting data. In FIG. 2, the flipflops 101 to 112 and 121 to 139, downstream of the serial-to-parallel conversion circuit 20, are driven by clocks, also termed "f/2 clocks", corresponding to received clocks (frequency=f Hz) halved in frequency by a frequency divider, not shown. The received clocks are generated by a recovery clock generating circuit, not shown, supplied with the received serial data to generate the clocks.

By the f/2 clocks, the flipflops 137 to 139 output signals corresponding to the comma detection signal from the comma detection circuit 30 delayed by 2 UI, 4 UI and 6 UI, respectively. The OR circuit 40, supplied with these signals, outputs a signal which continues to be high during a period of 8 UI as from a time point of transition from a low level to a high level of the comma detection signal (pulse width=2 UI) output from the comma detection circuit 30.

The three-stage flipflops 131 to 133 and 134 to 136 provide for data delay in association with the flipflops 137 to 139 adapted for delaying the comma detection signals.

A series of flipflops 121 to 125 and a series of flip-flops 126 to 130 convert serial 5 bits into parallel bits, respectively.

The selector interchanges the positions of output bits, depending on whether the comma detection circuit 30 has detected the leading bit of the comma code in an even bit string or in an odd bit string. The selector 60 also performs bit position interchange in case of, e.g., one-bit deviation of the command code.

The selector 60 is supplied with a switching signal from the comma detection circuit 30 as a selection control signal to manage switching control as to whether the outputs of the flipflops 125, 130 are to be output as first bit and second bit, respectively, or as second bit and first bit, respectively. The selector 60 also manages control, based on the switching signal from the comma detection circuit 30, as to whether the outputs of the flipflops 124, 129 are to be output as third and fourth bits, respectively, or in an interchanged manner, that is, as fourth and third bits, respectively. The selector 60 also manages control, based on the switching signal from the comma detection circuit, as to whether the outputs of the flipflops 123, 128 are to be output as fifth and sixth bits, respectively, or in an interchanged manner, that is, as sixth and fifth bits, respectively, while managing control in a similar manner as to whether the outputs of the flipflops 122, 127 are to be output as seventh and eighth bits, respectively, or in an interchanged manner, that is, as eighth and seventh bits, respectively, and as to whether the outputs of the flipflops 121, 126 are to be output as ninth and tenth bits, respectively, or in an interchanged manner, that is, as tenth and ninth bits, respectively.

FIG. 3 shows an illustrative configuration of the recovery clock generating circuit 50 of FIG. 2. In FIG. 3, the recovery clock generating circuit 50 is comprised of a state machine (quinary counter), made up of three-stage flipflops 501, 503 and 506 (reg0, reg1, reg2), and is run by f/2 clocks, corresponding to the received clocks (frequency: f [Hz]) halved in frequency. The recovery clock generating circuit 50 also includes a NAND circuit 510, supplied with the comma detection signal and with a signal corresponding to an output of the flipflop 506 inverted by an inverter 509, and a NAND circuit 502, supplied with an output of the flipflop 501 and an output of the NAND circuit 510. The recovery clock generating circuit 50 also includes a flipflop 503 for sampling an output of the NAND circuit 502 with f/2 clocks and for outputting the sampled output, a NAND circuit 504 for receiving an output of the flipflop 503 and an output of the NAND circuit 510, and an inverter 505 for receiving an output of the NAND circuit 504. The recovery clock generating circuit 50 moreover includes a flipflop 506 for sampling an output of the inverter 505 with f/2 clocks and for outputting the resulting sampled output, an inverter 508 for receiving an output of the flipflop 506, and a NOR circuit 507 for receiving outputs of the NAND circuit 504 and the inventer 508. The flipflop 501 samples an output of the NOR circuit 507 with f/2 clocks to output the sampled output to the NAND circuit 502.

FIG. 4 shows the process of state transitions of the three-stage flipflops 501, 503 and 506 (reg0. reg1 and reg2) of FIG. 3. Meanwhile, in FIG. 4, the state is represented by numerals within circle (○) symbols.

Referring to FIGS. 3 and 4, the recovery clock generating circuit 50 assumes five states of from 1 to 5 and frequency-divides the frequency of f/2 clocks by five to generate recovery clocks f/10 (Hz). The recovery clock generating circuit is a quinary counter for counting f/2 clocks, with the high-level period of the recovery clocks being 6 UI for the states 3 to 5 and with the low level period being 4 UI for the states 1 and 2. In case the comma detection signal is at a low level (logic 0), the recovery clock generating circuit operates as a quinary counter which transfers through the states 1 to 5 based on the f/2 clocks. When the comma detection signal is at a high level (logic 1) and the recovery clock is at a low level (logic 0), the recovery clock generating circuit is set to the state 2 of (reg0, reg1, reg2)=(0,1,0) by the NAND circuit 510. Even in case the comma detection signal goes high (logic 1) during the high level period of the recovery clock, the state machine transfers from the state 3,4,5 to the next state.

The outline of the operation of the circuit of FIG. 3 are now explained. When the comma detection signal is at a low level, and the recovery clock generating circuit is in state 1 ((reg0, reg1, reg2)=(0,0,0)), outputs of the NAND circuits 510, 502 and 504; inverters 505, 508; NOR circuit 507 and the inverter 509 are at (1,1,1,0,1,0,1). At the next f/2 clock, the flipflop 503 assumes logic 1, such that the recovery clock generating circuit is in state 2 ((reg0, reg1, reg2)=(0,1,0)). At this time, outputs of the NAND circuits 510, 502 and 504; inverters 505, 508; NOR circuit 507 and the inverter 509 are at (1,1,0,1,1, 0,1). With the next f/2 clock, the flipflop 506 assumes logic 1, such that the recovery clock generating circuit is in state 3 ((reg0, reg1, reg2)=(0,1,1)). The ensuing operations are similar to those described above, such that, responsive to the f/2 clock, the recovery clock generating circuit transfers to states 4, 5 and 1 in this order. When the comma detection signal is at a low level, the recovery clock, output from the flipflop 506, is output as a clock waveform with a high level of 6 UI and a low level of 4 UI, with one period being 10 UI (frequency=f/10).

Meanwhile, state 6 ((reg0, reg1, reg2)=(1,0,0)) transfers to state 1 with the next f/2 clock. State 8 ((reg0, reg1, reg2)=(1, 1,0)) transfers to state 7 ((reg0, reg1, reg2)=(0,0,1)) with the f/2 clock and further to state 2 ((reg0, reg1, reg2)=(0,1,0)) with the next f/2 clock. When the comma detection signal is at the low level, the state of the quinary counter transfers with directivity through the states of 1 to 5. There is no transition to the states 6 to 8 in FIG. 4, which represent states that cannot be assumed.

When the comma detection signal, output from the OR circuit 40 of FIG. 2, is at a high level (logic 1), and the recovery clock is at a low level (logic 0), the output of a NAND circuit 510 is at a low level, while the outputs of the circuits 502, 504 are both at high levels, such that the state machine of FIG. 3 is set and held in state 2 ((reg0, reg1, reg2)=(0,1,0)).

When the comma detection signal is at a high level (logic 1), and the recovery clock, output from the recovery clock generating circuit 50, is at a high level (in one of the states 3, 4 and 5), the output of the NAND circuit 510 goes high, with the state machine of FIG. 3 continuing to transfer from the current state to the next state. When the comma detection signal is at a high level (logic 1), the state machine is not held in state 2, in case the recovery clock is at a low level (logic 0).

FIGS. 5A-5F illustrate the operation of the recovery clock generating circuit 50 in association with bit deviation of the comma code. In FIGS. 5A-5F, the state is denoted by a numeral within circle (○) marks. The comma detection signal, entered to the recovery clock generating circuit 50 from the OR circuit 40, has a pulse width of 8 UI.

Figure 5A:
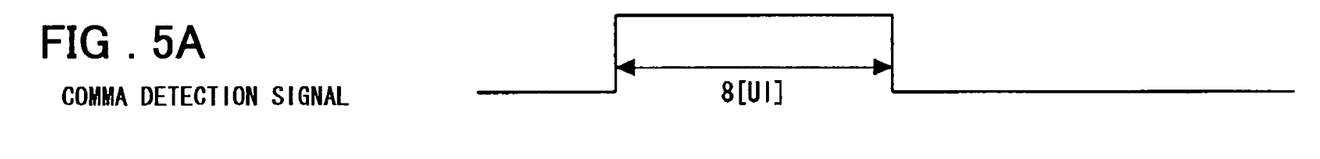
FIGS. 5A, 5B, 5C, 5D, 5E and 5F show signal waveforms of a comma detection signal and recovery clocks at the time of shift deviation in the first embodiment of the present invention.
Figure 5B:
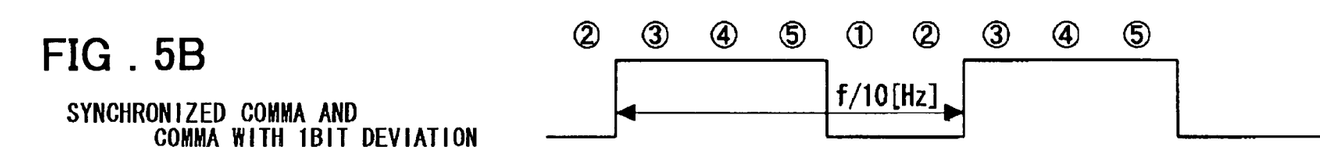

In case of a synchronized bit and one bit deviation of the comma code, the period of the recovery clock is f/10, as shown in FIG. 5B. That is, in case of rising transition of the recovery clock (transition to state 3), the comma detection signal is at a high level and the state machine of FIG. 3 transfers in a sequence of state 4→state 5→state 1, as shown in FIG. 5B. In state 1, the recovery clock is at a low level. In case the comma detection signal is at a high level and the recovery clock is at a low level, the state machine of FIG. 3 is set to state 2 with the next f/2 clock. Since the comma detection signal is at a low level at this time, the state machine transfers to state 3 with the next f/2 clock. Hence, the period of the recovery clock is f/10.

Figure 5C:
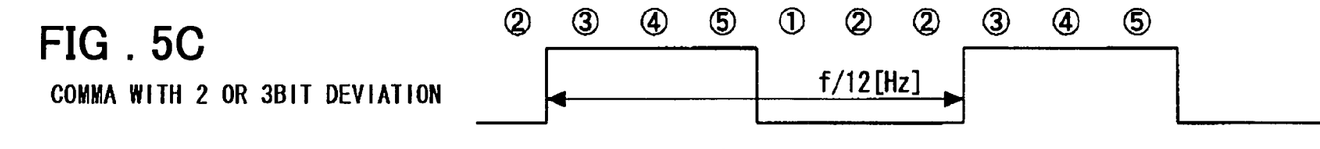

In case the comma code is deviated by 2 bits or 3 bits, only one cycle of the recovery clocks becomes longer and is equal to f/12, as shown in FIG. 5C. That is, as shown in FIG. 5C, the comma detection signal is at a high level in state 3, and the state machine of FIG. 3 transfers in a sequence of state 4→state 5→state 1, whereat the recovery clock being at a low level. Since the comma detection signal is at a high level (logic 1) and the recovery clock is at a low level (logic 0), the state machine of FIG. 3 is set to state 2 ((reg0, reg1, reg2)= (0,1,0)). Next, with the f/2 clock cycle, since the comma detection signal is at a high level (logic 1) and the recovery clock is at a low level (logic 0), the state machine of FIG. 3 is held in state 2 ((reg0, reg1, reg2)=(0,1,0)), without transferring to state 3. When the comma detection signal goes low (logic 0), the state machine of FIG. 3 transfers to state 3. Thus, when the comma code suffers from deviation of 2 bits or 3 bits, the period of the recovery clock is extended only once to f/12. As from the next cycle, the recovery clock period is f/10.

Figure 5D:
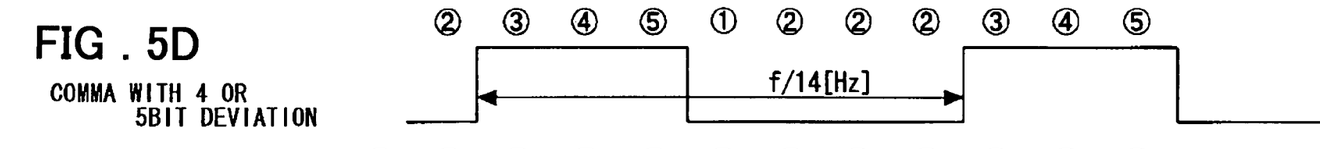

When the comma code suffers from deviation of 4 bits or 5 bits, the period of the recovery clock is extended to f/14 only for one cycle, as shown in FIG. 5D. That is, with state 4, for example, the comma detection signal is at a high level, as shown in FIG. 5D. The comma detection signal is delayed by a maximum of 2 UI. The state machine of FIG. 3 transfers in a sequence of state 4→state 5→state 1, with the recovery clock going low. Since the comma detection signal is at a high level (logic 1), and the recovery clock is at a low level (logic 0), the state machine is set and held in state 2 ((reg0, reg1, reg2)=(0,1,0)), without transferring to state 3. Next, in the clock cycle, the comma detection signal is at a high level (logic 1) and the recovery clock is at a low level (logic 0), so that the state machine is set and held in state 2 ((reg0, reg1, reg2)=(0,1,0)), without transferring to state 3. When the comma detection signal goes low (logic 0), the state machine of FIG. 3 transfers to state 3. Thus, when the comma code suffers from deviation of 4 bits or 5 bits, the period of the recovery clock is extended only once to f/14. As from the next cycle, the recovery clock period is f/10.

Figure 5E:
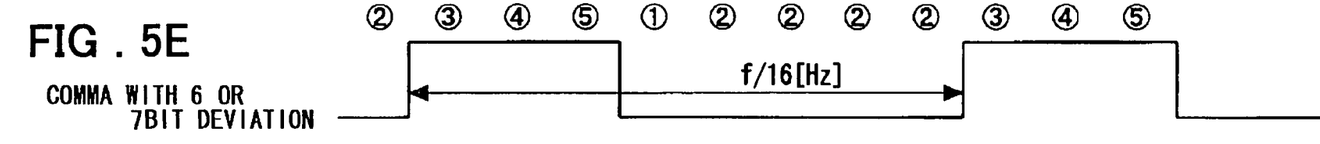

When the comma code suffers from deviation of 6 bits or 7 bits, the period of the recovery clock is extended to f/16 only for one cycle, as shown in FIG. 5E. That is, with state 5 (delayed from the state of FIG. 5B by 6 UI), for example, the comma detection signal is at a high level, as shown in FIG. 5E. The state machine of FIG. 3 transfers in a sequence of state 5→state 1, with the recovery clock going low. Since the comma detection signal is at a high level (logic 1), and the recovery clock is at a low level (logic 0), the state machine is set and held in state 2 ((reg0, reg1, reg2)=(0,1,0)). The state machine of FIG. 3 keeps on to be set in state 2 ((reg0, reg1, reg2)=(0,1,0)) for four clock cycles, as shown in FIG. 5E. When the comma detection signal goes low (logic 0), the state machine transfers from state 2 to state 3. Thus, when the comma code suffers from deviation of 6 bits or 7 bits, the period of the recovery clock is extended only once to f/16. As from the next cycle, the recovery clock period is f/10.

Figure 5F:
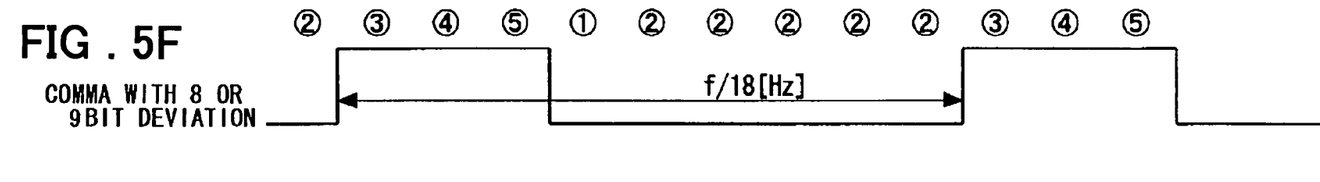

When the comma code suffers from deviation of 8 bits or 9 bits, the period of the recovery clock is extended to f/18 only for one cycle, as shown in FIG. 5F. That is, with state 1 (delayed from the state of FIG. 5B by 8 UI), for example, the comma detection signal is at a high level, as shown in FIG. 5F. The counter is in state 1 and the recovery clock is at a low level. Since the comma detection signal is at a high level (logic 1) and the recovery clock is at a low level (logic 0), the state machine is set and held in state 2 ((reg0, reg1, reg2)=(0, 1,0)). The state machine of FIG. 3 keeps on to be set in state 2 ((reg0, reg1, reg2)=(0,1,0)) for the duration of next five clock cycles (for 10 UI). When the comma detection signal goes low (logic 0), the state machine of FIG. 3 transfers from state 2 to state 3. Thus, if the comma code suffers from bit deviation of eight or nine bits, the period of the recovery clock is extended only once to f/18. As from the next cycle, the recovery clock period is f/10.

Thus, with the present embodiment, in which the recovery clock generating circuit 50 manages control to mask the comma detection signal during the high level period of the recovery clock, the clock period of the recovery clock is elongated, at the time of bit alignment, without dependency on the arrival timing of the comma code, to provide for sufficient timing margin. Hence, when the circuit of the present invention is applied to a high speed serial interface, no timing violation is produced in a circuit driven by the recovery clocks, or in a downstream side circuit, not shown, adapted for receiving parallel data byte-aligned by the recovery clocks.

Figure 6:
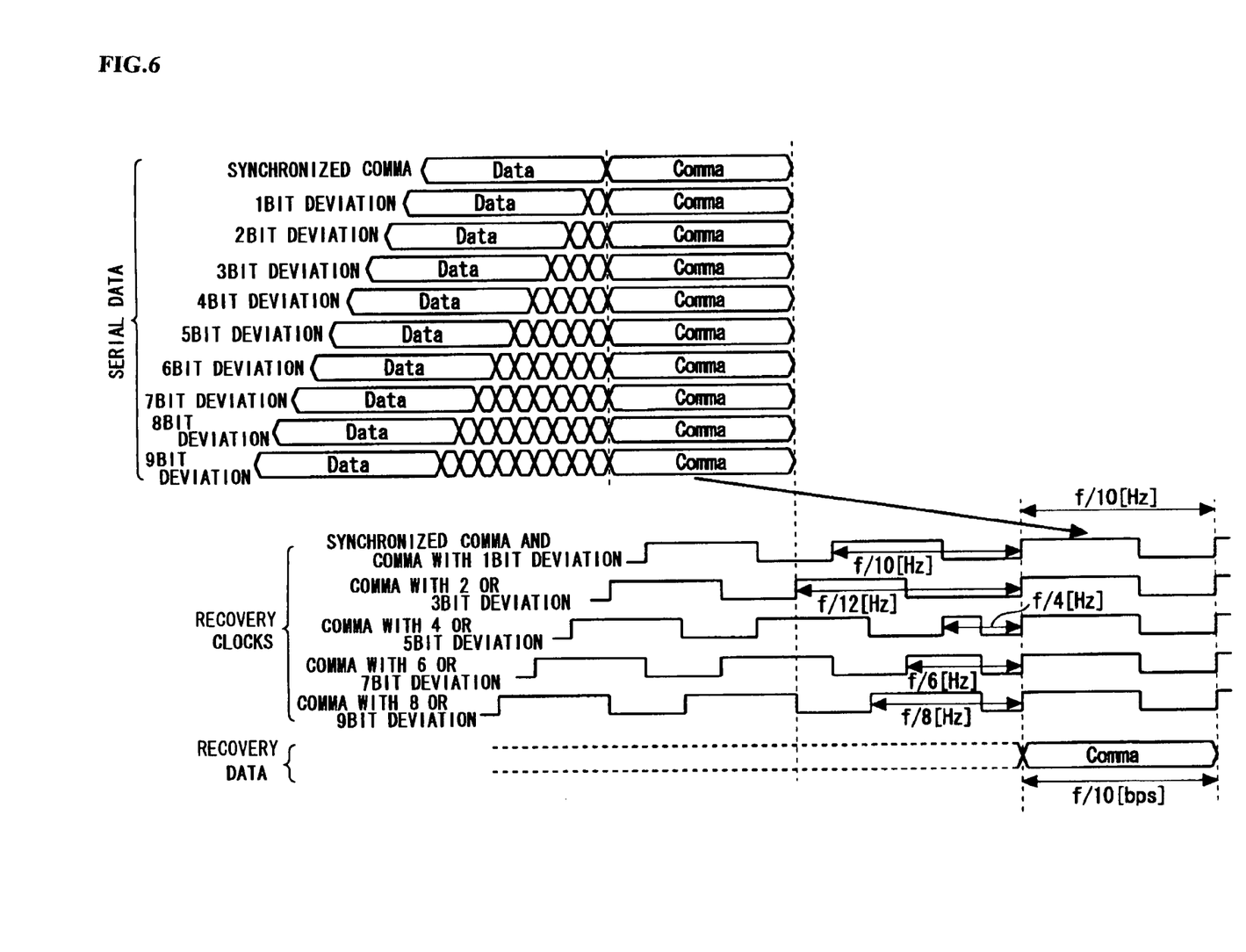
FIG. 6 illustrates the operating principle of a second embodiment of the present invention.

FIG. 6 shows the configuration of a second embodiment of the present invention. In the preceding embodiment, the clock period of the recovery clocks is elongated at the time of bit alignment, without dependency on the arrival timing of the comma code in the received serial data. With the present second embodiment, the configuration is the same as that in the first embodiment insofar as received serial data are serial-to-parallel converted by 1:2 in an input stage of the demultiplexer circuit and the operation inside the demultiplexer circuit is by clocks obtained on frequency halving the received clocks. The present second embodiment is, however, used for an application in which it is not mandatory to elongate the clock period of the recovery clocks, at the time of bit alignment, depending on bit deviation between the comma code and symbol data.

In the present embodiment, the magnitudes of bit deviation of the comma code and changes in the period of the recovery clock, may be summarized as follows:

(A) The period of a recovery clock for a synchronized comma code and a comma code with one-bit deviation is f/10 [Hz];
(B) the period of a recovery clock for a comma code with two-bit deviation and a comma code with three-bit deviation is f/12 [Hz];
(C) the period of a recovery clock for a comma code with four-bit deviation and a comma code with five-bit deviation is f/4 [Hz];
(D) the period of a recovery clock for a comma code with six-bit deviation and a comma code with seven-bit deviation is f/6 [Hz]; and
(E) the period of a recovery clock for a comma code with eight-bit deviation and a comma code with nine-bit deviation is f/8 [Hz].

Figure 7:
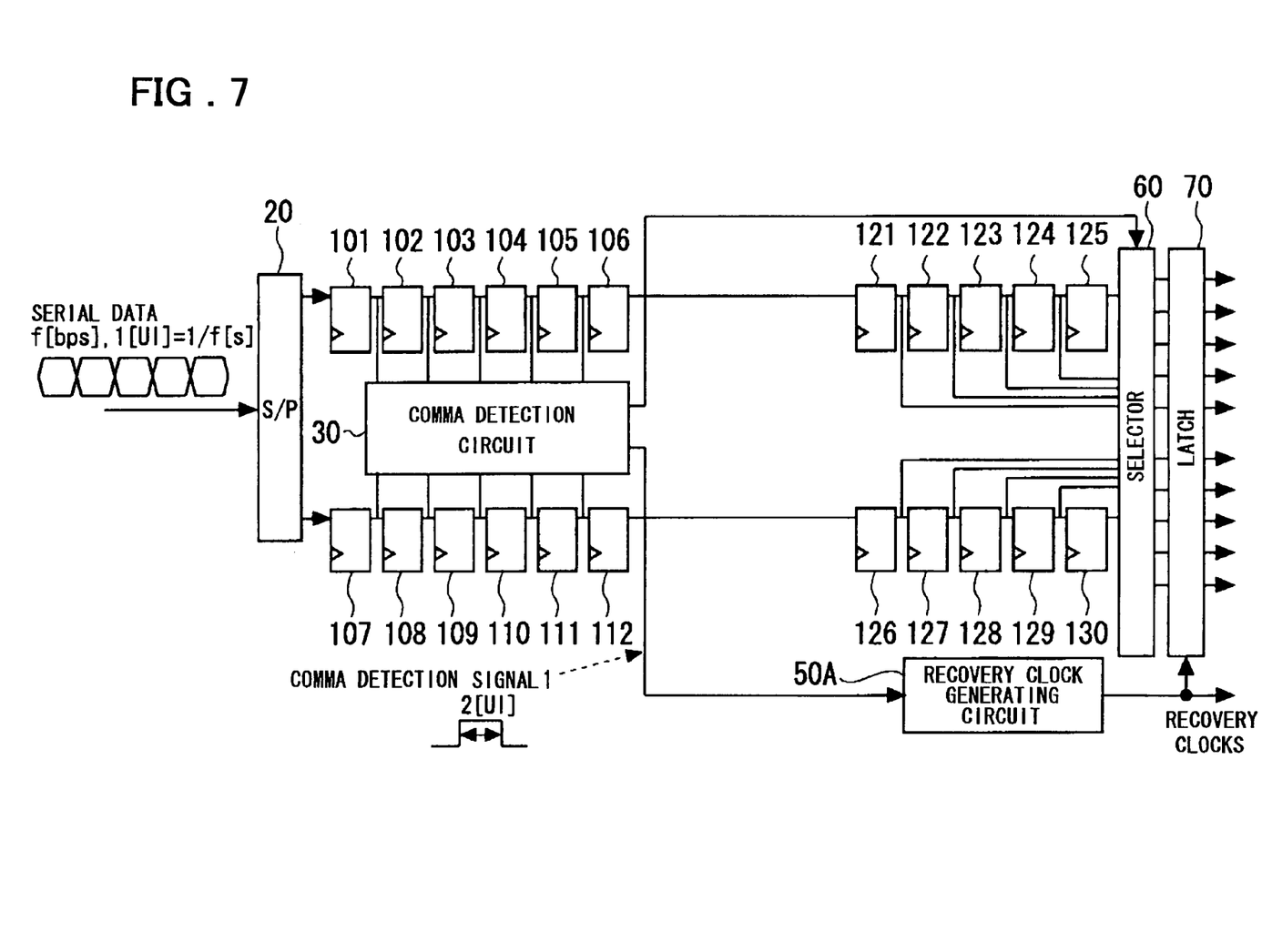
FIG. 7 shows the configuration of a demultiplexer circuit according to a second embodiment of the present invention.

FIG. 7 shows the configuration of the second embodiment of the present invention. In FIG. 7, the components which are the same as those shown in FIG. 2 are indicated with the same reference numerals. These common components are not explained in the following, and only the points of difference from the previous embodiment are explained.

In the second embodiment of the present invention, the circuitry for elongating the high-level period of the clock detection signal (OR 40 and flipflops 137 to 139 of FIG. 2) is omitted and, concomitantly, the flipflops 131 to 133 and 134 to 136 are omitted. Additionally, the configuration of a recovery clock generating circuit 50A of the second embodiment of the present invention differs from that of the recovery clock generating circuit 50 of the previous embodiment.

Figure 8:
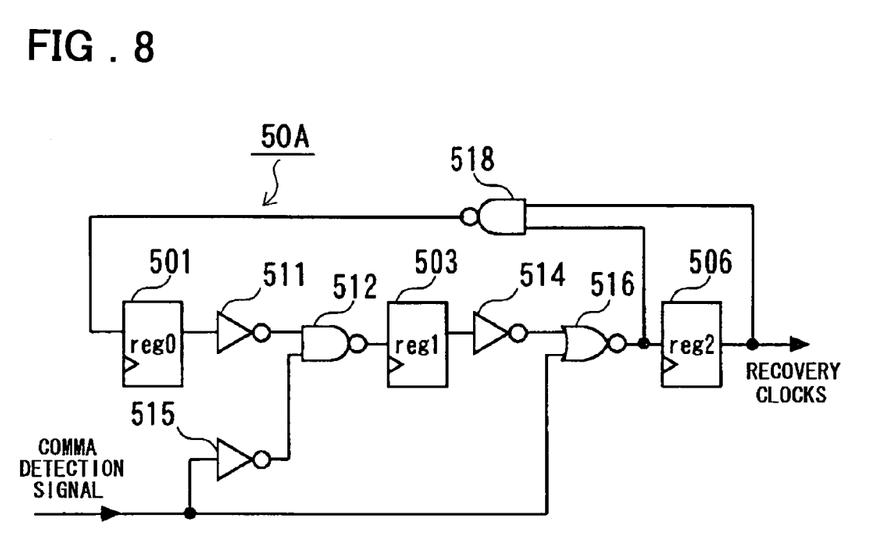
FIG. 8 shows the configuration of a recovery clock generating circuit of the second embodiment of the present invention.
Figure 9:
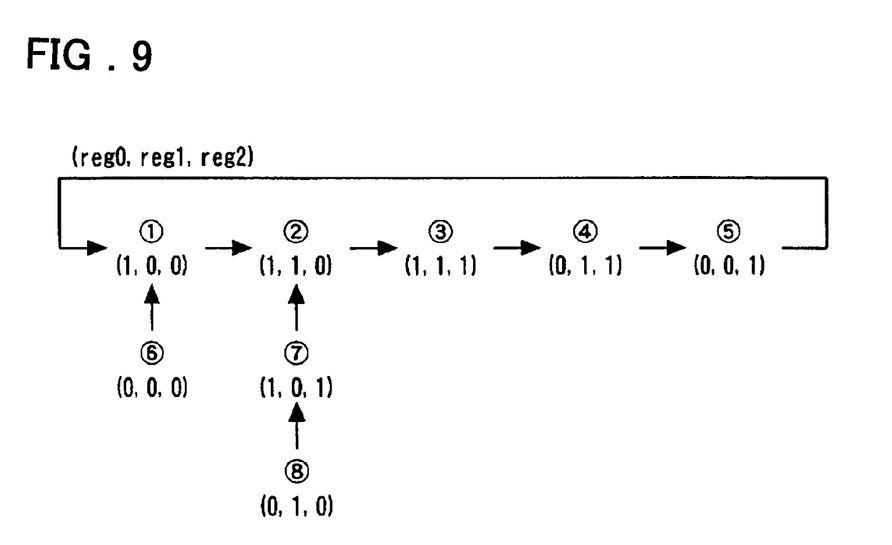
FIG. 9 illustrates state transitions in the recovery clock generating circuit of the second embodiment of the present invention.

FIG. 8 shows a configuration of the recovery clock generating circuit 50A. FIG. 9 shows status transitions of the recovery clock generating circuit 50A of FIG. 8. Referring to FIGS. 8 and 9, the recovery clock generating circuit 50A is comprised of a quinary counter, including three-stage flipflops 501, 503 and 506, and sets the recovery clocks to a high level during the period of state 3→state 4→state 5 and to a low level during the period of state 1→state 2. The recovery clock generating circuit 50A includes an inverter 511 for receiving an output of the flipflop 501, an inverter 515 for inverting a comma detection signal, a NAND circuit 512 for receiving outputs of the inverters 511 and 515, a flipflop 503 for sampling an output of the NAND circuit 512 with f/2 clocks and for outputting the sampled output, an inverter 514 for receiving an output of the flipflop 503, and a NOR circuit 516 for receiving the comma detection signal and an output of the inverter 514. The recovery clock generating circuit also includes a flipflop 506 for sampling an output of the NOR circuit 516 with f/2 clocks and for outputting the sampled output, and a NAND circuit 518 supplied with an output of the NOR circuit 516 and with an output of the flipflop 506. The flipflop 501 samples an output of the NAND circuit 518 with f/2 clocks to output the sampled output. Meanwhile, if no high-level comma detection signal is entered, a status machine shown in FIG. 8 sequentially transfers through five states of from states 1 to 5, without being able to assume states 6 to 8, which are not assumable states.

Referring to FIG. 8, showing the recovery clock generating circuit 50A of the present embodiment, there is omitted, from the configuration of the state machine shown in FIG. 3, a control circuit for setting to the state 2 of FIG. 4 in case the recovery clock is at a low level and the comma detection signal is at a high level (NAND circuit 510 of FIG. 3). In the configuration shown in FIG. 8, when the comma detection signal is at a high level, a low level is supplied to the NAND circuit 512, through an inverter 515, with the output of the NAND circuit 512 being high. With the comma detection signal at a high level, the output of the NOR circuit 516 goes low, with the output of the NAND circuit 518 being high. That is, with the comma detection signal at a high level (pulse width=2 UI), the state machine of FIG. 8 is set to (reg0, reg1, reg2)=(1,1,0) with the next f/2 clock.

FIGS. 10A-10F illustrate the operation of the recovery clock generating circuit 50A in association with bit deviation. Meanwhile, the state is represented by numerals within circle (○) symbols. In the recovery clock generating circuit 50A, the comma detection signal has a pulse width of 2 UI.

Figure 10A:
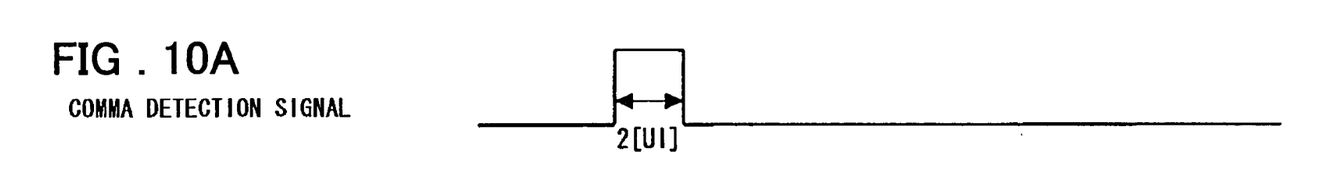
FIGS. 10A, 10B, 10C, 10D, 10E and 10F show signal waveforms of a comma detection signal and recovery clocks at the time of shift deviation in the second embodiment of the present invention.
Figure 10B:
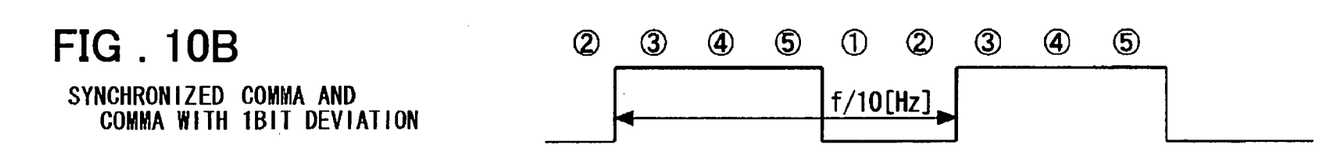

With the synchronized bit and with one-bit deviation, the period of the recovery clocks is f/10, as shown in FIG. 10B.

Figure 10C:
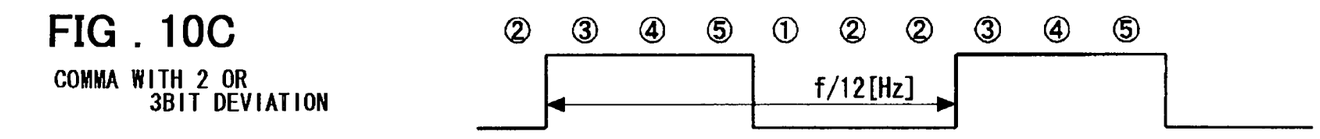

In case the comma code is deviated by 2 bits or 3 bits, only one cycle of the recovery clocks becomes longer and is equal to f/12, as shown in FIG. 10C. Referring to FIG. 10C, a high-level period (2 UI) of the comma detection signal is set at an initial state 2 of a time period when the recovery clocks keep on to be high for three consecutive cycles, and state 3 is set for the next cycle. Since the comma detection signal is at a low level at this time, the state machine transfers to state 3 with the next cycle. In this manner, when the comma code suffers from 2-bit deviation or 3-bit deviation, the period of the recovery clocks becomes longer and is equal to f/12 only once (with the frequency being low). The period of the recovery clocks becomes f/10 as from the next cycle.

Figure 10D:
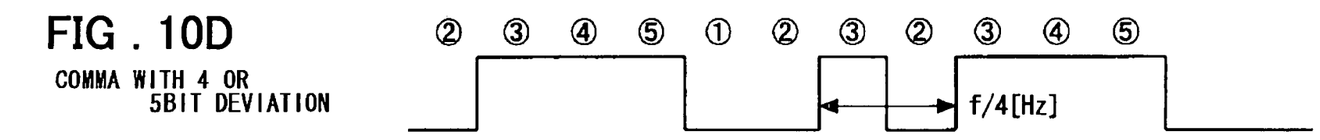

In case the comma code is deviated by 4 bits or 5 bits, only one cycle of the recovery clocks becomes longer and is equal to f/4, as shown in FIG. 10D. In, e.g., state 3 out of the states 3 and 2, indicated by arrow f/4 in FIG. 10D, the comma detection signal goes high, such that state 2 is set for the next cycle. Since the comma detection signal goes low at this time, the status machine transfers to the state 3 with the next cycle. Thus, if the comma code suffers from 4-bit or 5-bit deviation, the period of the recovery clocks becomes shorter only once and is equal to f/4. The period of the recovery clocks becomes f/10 as from the next cycle.

Figure 10E:
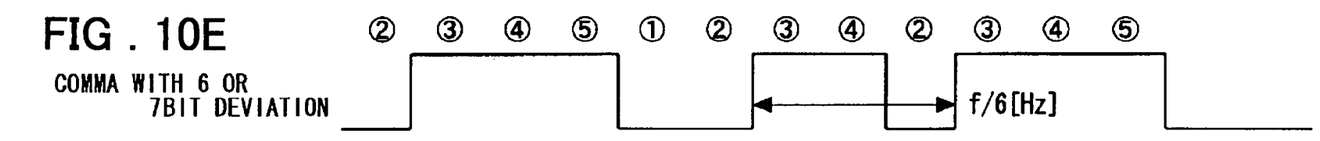

In case the comma code is deviated by 6 bits or 7 bits, only one cycle of the recovery clocks becomes longer and is equal to f/6, as shown in FIG. 10E. In, e.g., state 4 out of the states 3, 4 and 2, indicated by arrow f/6 in FIG. 10E, the comma detection signal goes high, such that state 2 is set for the next cycle. Since the comma detection signal goes low at this time, the status machine transfers to state 2 with the next cycle. Thus, if the comma code suffers from 6-bit or 7-bit deviation, the period of the recovery clocks becomes shorter only once and is equal to f/6. The period of the recovery clocks becomes f/10 as from the next cycle.

Figure 10F:
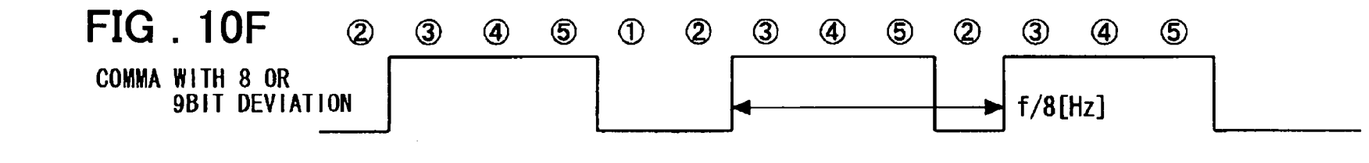

In case the comma code is deviated by 8 bits or 9 bits, only one cycle of the recovery clocks becomes longer and is equal to f/8, as shown in FIG. 10F. In e.g. a state 5 out of the states 3, 4, 5 and 2, indicated by arrow f/8 in FIG. 10F, the comma detection signal goes high, such that the state 2 is set for the next cycle. Since the comma detection signal goes low at this time, the status machine transfers to state 3 with the next cycle. Thus, if the comma code suffers from 8-bit or 9-bit deviation, the period of the recovery clocks becomes shorter only once and is equal to f/8. The period of the recovery clocks becomes f/10 as from the next cycle. In the present embodiment, the period of the recovery clocks becomes equal to f/4, f/6 or f/8, shorter than f/10, depending on bit deviations. However, the circuit configuration is simpler than that of the previous embodiment.

Although the present invention has been described with reference to preferred embodiments thereof, it is noted that the present invention is not limited to the embodiments illustrated and may encompass other variations or corrections that may readily occur to those skilled in the art within the scope of the invention as defined in the claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A demultiplexer circuit comprising:
   a first serial-to-parallel conversion circuit for receiving input serial data and for performing serial-to-parallel conversion to output resultant data to parallel paths;
   a code detection circuit for activating and outputting a detection signal on detection of coincidence between output data sent out from said first serial-to-parallel conversion circuit to said parallel paths and a predetermined check code;
   a circuit for generating recovery clocks of a period corresponding to the length of a predetermined number of bits of said input serial data, and for varying the period of said recovery clocks, in case said detection signal from said code detection circuit is activated, in dependence upon bit deviation of said detection signal, to output resulting recovery clocks; and
   a second serial-to-parallel conversion circuit for converting data serially transmitted on said parallel paths into parallel data to output resulting parallel data responsive to said recovery clocks.

2. The demultiplexer circuit as defined in claim 1 further comprising:
   a circuit for elongating by a predetermined time duration of only one period of said recovery clocks based on clock signals of a frequency having been frequency-divided from a transfer frequency of said input serial data, depending on said bit deviation, on activation of said detection signal.

3. The demultiplexer circuit as defined in claim 1 further comprising:
   a circuit for periodically generating said recovery clocks based on clock signals of a frequency having been frequency-divided from the transfer frequency of said input serial data, when said detection signal is inactivated, in accordance with periods corresponding to the length of a predetermined number of bits of said input serial data.

4. The demultiplexer circuit as defined in claim 1 further comprising:
   a control circuit for receiving said detection signal output from said code detection circuit and for elongating the time duration of the activated state of said detection signal to output a resulting signal; and
   a circuit for setting said recovery clocks to an activated state when an output signal of said control circuit is in an activated state and said recovery clocks are in an inactivated state.

5. The demultiplexer circuit as defined in claim 1 wherein
   said first serial-to-parallel conversion circuit serially receives said input serial data to perform 1:2 serial-to-parallel conversion thereon to output resulting data to first and second parallel paths;
   said second serial-to-parallel conversion circuit comprising:
   a switching circuit for interchanging outputs of corresponding registering stages of said shift registers of said first path and said shift registers of said second path; and
   a latch circuit for receiving an output of said switching circuit and for outputting parallel data responsive to said recovery clocks.

6. A demultiplexer circuit comprising:
   a serial-to-parallel conversion circuit for receiving received serial data and for performing serial-to-parallel conversion on said serial data to output resulting two-path data;
   a code detection circuit for activating and outputting a detection signal on detection of coincidence of said two-path output data from said serial-to-parallel conversion circuit with a predetermined check code;
   a recovery clock generating circuit composed of a state machine transferring between different states based on frequency-divided clocks of received clocks, said recovery clock generating circuit generating recovery clocks of periods corresponding to predetermined bit lengths of said received input serial data, said recovery clock generating circuit varying the period of said recovery clocks, and outputting the resulting clocks, on activation of said detection signal, responsive to bit deviation;
   first and second shift registers for converting said serial data, branched and transmitted on said two paths, into parallel data; and
   a latch circuit for receiving outputs of respective stages of said first and second shift registers in parallel and for sampling said outputs with said recovery clocks to output sampled data.

7. A demultiplexer circuit comprising:
   a serial-to-parallel conversion circuit for receiving serial data and for performing serial-to-parallel conversion on said serial data to output resulting two-path data;
   a code detection circuit for activating and outputting a detection signal on detection of coincidence of said two-path output data from said serial-to-parallel conversion circuit with a predetermined check code;
   a control circuit for receiving said detection signal from said code detection circuit and for outputting a signal corresponding to said detection signal the time duration of the activated state of which is extended by a predetermined value;

a recovery clock generating circuit composed of a state machine transferred between different states based on frequency-divided clocks of received clocks, said recovery clock generating circuit generating recovery clocks of periods corresponding to predetermined bit lengths of said received input serial data, said recovery clock generating circuit receiving the output signal of said control circuit for varying periods of said recovery clocks to output a resulting signal;

first and second delay circuits for delaying transmitted data of said two paths by a time corresponding to delay time in said control circuit;

first and second shift registers for receiving outputs of said first and second delay circuits, and for converting said outputs into parallel data; and a latch circuit for receiving outputs of respective stages of said first and second shift registers in parallel and sampling the parallel outputs to output resultant parallel data.

8. The demultiplexer circuit as defined in claim 7 wherein when the output signal from said control circuit is in an activated state and said recovery clocks are in an inactivated state, said state machine sets said recovery clocks to the activated state.

9. The demultiplexer circuit as defined in claim 6 further comprising:

a selector circuit for receiving first and second outputs of registering stages of said first and second shift registers and for interchanging the first and second outputs responsive to predetermined bit deviations of said detection signal to send the interchanged outputs to said latch circuit.

10. The demultiplexer circuit as defined in claim 7 further comprising:

a selector circuit for receiving first and second outputs of registering stages of said first and second shift registers and for interchanging the first and second outputs responsive to predetermined bit deviations of said detection signal to send the interchanged outputs to said latch circuit.

11. A semiconductor device having the demultiplexer circuit as defined in claim 1.

12. A semiconductor device having the demultiplexer circuit as defined in claim 6.

13. A semiconductor device having the demultiplexer circuit as defined in claim 7.

* * * * *